(12) United States Patent
Chamayou et al.

(10) Patent No.: US 8,598,310 B2
(45) Date of Patent: Dec. 3, 2013

(54) INTERLOCK AND PROCESS

(75) Inventors: Jean-Louis Chamayou, Carry le Rouet (FR); Stephen Kevin Lee, Merton Park (GB)

(73) Assignee: Ineos Commercial Services UK Limited, Hampshire (GB)

( * ) Notice: Subject to any disclaimer, the term of this patent is extended or adjusted under 35 U.S.C. 154(b) by 0 days.

(21) Appl. No.: 13/700,855

(22) PCT Filed: Jun. 28, 2011

(86) PCT No.: PCT/EP2011/060793
§ 371 (c)(1),
(2), (4) Date: Dec. 5, 2012

(87) PCT Pub. No.: WO2012/004155
PCT Pub. Date: Jan. 12, 2012

(65) Prior Publication Data
US 2013/0072653 A1 Mar. 21, 2013

(30) Foreign Application Priority Data
Jul. 8, 2010 (EP) .................................... 10168846

(51) Int. Cl.
*C08F 6/00* (2006.01)
*C08J 3/00* (2006.01)
(52) U.S. Cl.
USPC ........................................ 528/480; 528/428
(58) Field of Classification Search
USPC ................................................ 528/428, 480
See application file for complete search history.

(56) References Cited

U.S. PATENT DOCUMENTS

| 3,257,375 A | 6/1966 | Norwood |
| 6,255,411 B1 | 7/2001 | Hartley et al. |

FOREIGN PATENT DOCUMENTS

| EP | 1 914 246 A1 | 4/2008 |
| EP | 1 914 248 A1 | 4/2008 |
| EP | 1 914 249 A1 | 4/2008 |
| EP | 1 914 250 A1 | 4/2008 |
| EP | 2 030 757 A1 | 3/2009 |
| EP | 2 172 494 A1 | 4/2010 |
| WO | WO 02/12353 A1 | 2/2002 |
| WO | WO 2004/039848 A1 | 5/2004 |
| WO | WO 2008/024517 A2 | 2/2008 |
| WO | WO 2008/024517 A3 | 2/2008 |

OTHER PUBLICATIONS

Specification of Co-pending U.S. Appl. No. 13/700,540, filed Nov. 28, 2012, 16 pgs.
PCT International Search Report; International Application No. PCT/EP2011/060787, mailed Sep. 13, 2011 (2 pgs).
Specification of Co-pending U.S. Appl. No. 13/700,597, filed Nov. 28, 2012, 20 pgs.
PCT International Search Report; International Application No. PCT/EP2011/060791, mailed, Sep. 13, 2011 (3 pgs).
Choi, K.Y., et al; "The Dynamic Behavior of Continuous Stirred-Bed Reactors for the Solid Catalyzed Gas Phase Polymerization of Propylene"; *Chemical Engineering Science*, vol. 43, No. 10; pp. 2587-2604 (1988) XP-002610731.

*Primary Examiner* — Terressa Boykin
(74) *Attorney, Agent, or Firm* — Nixon & Vanderhye

(57) ABSTRACT

Interlock for use in a process for degassing of a polymer powder in a degassing vessel. The interlock includes (a) measuring the temperature of the vapor phase resulting from a liquid-vapor separation, which vapor phase is used as a purge gas in a degassing vessel, (b) comparing the measured temperature to a threshold value, and (c) in the event that the measured temperature is above the threshold value then use of the vapor as purge gas is stopped or reduced.

16 Claims, No Drawings

INTERLOCK AND PROCESS

This application is the U.S. national phase of International Application No. PCT/EP2011/060793 filed 28 Jun. 2011 which designated the U.S. and claims priority to European Patent Application No.: 10168846.3 filed 8 Jul. 2010, the entire contents of each of which are hereby incorporated by reference.

The present invention relates to the degassing of polymer powder.

The production of polymer powder by polymerisation reactions of monomers in the presence of catalysts is well-known. For example, processes are known and widely operated commercially using both fluidised bed reactors and slurry phase reactors.

In the gas fluidised bed polymerisation of olefins the polymerisation is conducted in a fluidised bed reactor wherein a bed of polymer particles is maintained in a fluidised state by means of an ascending gas stream comprising the gaseous reaction monomer. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid.

In a slurry polymerisation process the polymerisation is conducted in a stirred tank or, preferably, a continuous loop reactor comprising mainly polyolefin, inert solvent (diluent) and a catalyst for the polymerisation. Polymer product is removed from the reactor in the form of a slurry of the reaction diluent.

The polymer product removed from the reactor is polymerisation processes may contain unreacted monomers and other hydrocarbon species (for example, hydrogen, ethane, methane, propane, pentane, hexane, butane) and these monomers and other hydrocarbons should be removed from the polymer product since failure to do so may lead to (a) hydrocarbons levels rising to explosive levels in downstream equipment or (b) environmental constraints being exceeded or (c) unacceptable product quality e.g. odours.

The removal of monomer and other residual hydrocarbons, which may be in gaseous or liquid form, is generally referred to as "degassing". One method that may be used is to contact the produced polymer with a gas in a purge vessel, usually a counter-currently flowing inert gas, such as nitrogen, known as a "purge gas". This is generally referred to as "purging". Another method which can be used is to subject the polymer to a pressure reduction, usually in entry to a suitable vessel, with the result that at least a portion of any hydrocarbons in liquid form vaporise. This step may be referred to as "flashing". Such methods may also be combined e.g. a pressure reduction and a purge gas may be applied in the same degassing vessel.

There are a number of prior art patents which describe methods for the removal of such hydrocarbons from the products of gas phase and slurry processes including one or more of such steps, such as U.S. Pat. No. 4,372,758, EP 127253, U.S. Pat. No. 5,376,742 and WO 02/88194.

U.S. Pat. No. 4,372,758, for example, describes a process which uses an inert gas such as nitrogen for the removal of unreacted gaseous monomer from the polymer product. Solid polymer is conveyed to the top of a purge vessel by means of an inert gas system, an inert gas stream is introduced into the bottom of the purge vessel and the solid polymer is counter currently contacted with the inert gas stream to remove the unreacted gaseous monomers from the solid polymer product. The unreacted monomers may then be mixed with an inert gas stream which is often passed to a flare for disposal or vented to the atmosphere.

EP 127253 describes a process for the removal of residual monomers from ethylene copolymers by subjecting the copolymer to a reduced pressure zone sufficient to desorb the monomer, sweeping the copolymer with reactor gas which is free of inert gases and recycling the resultant gas containing the desorbed monomer to the polymerisation zone.

A number of factors affect the rate at which the residual monomers and other components that might be present are removed. U.S. Pat. No. 4,372,758 describes a number of these, including temperature and pressure in the purge vessel, resin particle size and morphology, monomer concentration in the resin, purge gas composition (monomer content) and purge gas flow rate, but there are also others.

More recently, WO 2008/024517 has described a method and apparatus for managing volatile organic content of polyolefins. In this disclosure a purge column model is described which is based on mass transfer theory, and which is used to control the degassing process such that the purge rates may be varied dependent on the polymer to be degassed.

The general teaching of the above is that increased removal of residual monomers can be achieved by increasing the temperature of the polymer powder (fluff) entering a purge vessel and/or the temperature of the purge gas, increasing the polymer residence time and/or increasing the stripping gas flow rate.

The degassing vessels are generally operated in order for the residual monomer level in the polymer to be reduced to desired levels prior to downstream treatment/processing. In particular, it is necessary to ensure that at the end of any degassing steps the residual hydrocarbon content is below any unsafe or environmentally unacceptable levels downstream. Although the degassing requirements can be determined experimentally or by past process experience for any particular polymer, the relationships are generally complex, and hence some form of measurement is required to ensure the required degassing.

In general, the degassing process will have safety interlocks which cause the process to be stopped if a "major" disruption occurs, for example, a complete loss of purge gas flow.

Whilst potentially serious, such problems are generally relatively easy to detect. More difficult to detect can be more subtle fluctuations in the overall process, such that the polymer powder exiting the degassing vessel comprises more residual hydrocarbons than desired.

One example of such a fluctuation is a reduction in purge gas purity. In general, it is not cost effective to continuously use "fresh" gas as purge gas, and hence purge gas exiting the degassing vessel is usually treated to reduce the concentration of degassed hydrocarbons and then recycled. Typically, this involves one or more steps in which the purge gas exiting the degassing vessel is cooled and compressed in order that hydrocarbons removed from the degassed polymer by the purge gas condense, and a liquid-vapour separation step. The resulting vapour is then recycled as purge gas. However, it is important that the removal of degassed hydrocarbons from the recycled purge gas is effected to a suitably low level, since the removal of hydrocarbons in the degassing vessel is an equilibrium process and higher hydrocarbon content in the purge stream entering the degassing vessel will reduce the efficiency of removal.

It is possible to analyse the purge gas entering the degassing vessel to determine its purity and it is also known to analyse the purge gas using gas chromatography (GC).

However, GC's are expensive items of kit and are prone to unreliability. It therefore becomes necessary to have redundant GC's, despite their cost. Further, GC analysis can still take a significant amount of time (5-10 min between samplings not being untypical) which also leads to a lag in potential response time. At the throughputs of commercial polymerisation units a significant amount of polymer which has not been effectively degassed can still exit the degassing vessel before any problem is detected by such systems.

We have now found an improved system for monitoring the quality of a recycled stripping gas used in a degasser which is reliable, rapid and simple to implement.

Thus, in a first aspect, the present invention provides an interlock for use in a process for degassing of a polymer powder in a degassing vessel, which interlock comprises
a. measuring the temperature of the vapour phase resulting from a liquid-vapour separation, which vapour phase is used as a purge gas in a degassing vessel,
b. comparing said measured temperature to a threshold value, and
c. in the event that the measured temperature is above the threshold value then the use of the vapour as purge gas is stopped or reduced.

As noted above, the concept of interlocks is known. In general terms interlocks may be provided for either safety or other operational reasons in a process. The present invention, however, relates to an "interlock" which relates to safety and as such the term "interlock" as used herein means an instrumented system which is designed to act in response to a condition within a process which indicates a potentially dangerous situation or consequence, and to thereby prevent or mitigate said situation or consequence.

Thus, the interlock monitors the process over time to check whether or not the condition does indicate a potentially dangerous situation or consequence, and if the condition does indicate such a situation or consequence the interlock will act to prevent or mitigate said situation or consequence.

It should also be noted that an interlock tends to only act on the basis of whether a defined condition is or is not met i.e. the monitored condition either does indicate a potentially dangerous situation or consequence, in which case the interlock will act, or it does not, in which case the interlock will not act (or will stop acting if it previously was). Thus, whilst, in general, interlocks can act on a process condition, such as temperature or pressure, this is in addition to, and usually will override as necessary, more general "steady state" process control based on such parameters. Further, the defined condition will usually be a condition outside normal operating ranges. For example, in the present invention the threshold value will be outside of (above) the normal range of temperature expected for the vapour phase exiting the separation vessel.

Another feature of "interlocks" is that they generally require a "reset", usually a manual reset, once they have been triggered. Thus, once triggered, even if the condition which caused the interlock to be triggered no longer exists, the interlock needs to be reset before the interlock response can be turned off. As an example, in the present invention, if the use of vapour from the separation vessel as purge gas has been stopped it does not automatically restart even if measured temperature decreases below the threshold value unless the interlock is manually reset.

The liquid-vapour separation takes place in a liquid-vapour separation vessel. The first aspect of the present invention is founded on the fact that the mixture of liquid and vapour in the separation vessel are in equilibrium, with the "heavier" components predominantly in the liquid phase. An increase in the temperature will result in a shift in the equilibrium which would cause an increase in the amount of the "heavier" components in the vapour phase. Thus, an increase in temperature of the vapour phase can be readily used as an indication that the amount of the "heavier" components which should be removed in the liquid phase has reduced, and that the amount of such components remaining in the vapour phase, and hence in the recycled purge gas stream has increased i.e. indicates a loss in separation efficiency in the separation vessel. If the temperature increases above a threshold value, the interlock of the present invention acts to either reduce or stop the use of the vapour as purge gas.

The threshold value for the vapour can be calculated by the person skilled in the art. This could be, for example, based on previous operating experience on the typical temperature variations in the vapour exiting the separation vessel, and setting a threshold above the maximum.

The variations acceptable by a particular operator may also depend on the relative efficiency and capacity of the subsequent process steps to deal with increases in hydrocarbons exiting the degasser if less pure purge gas is used.

In one example, the threshold value may be defined based on a minimum difference from the expected temperature under normal operating conditions, for example 10° C. higher.

The expected temperature can also be calculated from a knowledge of the liquid levels and pressures within the separation vessel.

The temperature of the vapour phase is preferably measured directly within the separation vessel. However, measurement downstream of the separation vessel can also be used as long as the downstream measurement can be correlated to the temperature within the separation vessel.

The liquid-vapour separation preferably occurs downstream of a condensation/compression system, by which is meant a system in which the purge gas is cooled and compressed in order that hydrocarbons removed from the degassed polymer by the purge gas condense to form a liquid phase for the subsequent separation.

It should be noted that the separation efficiency in the liquid-vapour separation in a separation vessel can also depend on the pressure and the liquid level therein. In general, the pressure in the liquid-vapour separation vessel results directly from the upstream compressor and does not vary significantly. Similarly, liquid level control is relatively routine, and so liquid-level does not vary significantly. Nevertheless, although the temperature-based measurement of the first aspect of the invention is the most likely to show a variation, an interlock is also provided which comprises measurements of the liquid level and the pressure.

Thus, in a second aspect, the present invention provides an interlock for use in a process for degassing of a polymer powder in a degassing vessel, which interlock comprises:
a. Measuring
 1) the liquid level,
 2) the temperature of the vapour phase, and
 3) the pressure of the vapour phase,
for a liquid-vapour separation using a liquid-vapour separation vessel from which the resulting vapour phase is used as a purge gas,
b. comparing each of said measured parameters to a corresponding threshold value, and
c. in the event that one or more of the following apply:
 i) the liquid level is above its defined threshold value, ii) the temperature is above its defined threshold value, or iii) the pressure is below its defined threshold value then the use of the resulting vapour phase as purge gas is stopped or reduced.

In the second aspect of the present invention a loss of efficiency in the separation is identified based on measurements of:

1) the liquid level,
2) the temperature of the vapour phase, and
3) the pressure of the vapour phase.

The threshold values for the liquid level and the pressure may also be determined by any suitable means, such as based on previous operating experience on the typical liquid level and pressure variations in the separation vessel, and setting thresholds relative to the maximum variations.

1) The Liquid Level

An increase in the liquid level increases the risk of entrained liquid being removed from the separation vessel with the vapour phase, and hence as purge gas. In general, the interlock acts as a liquid level alarm which indicates that the liquid level is so high that an unacceptable level of entrainment is likely, and which therefore stops or reduces the recycling of vapour until the liquid level is reduced. Additional alarms may be present warning of increases in liquid level "approaching" the level at which recycling is stopped or reduced in order to enable the operator to try and react prior to such a situation. For example, there may be a first alarm which indicates that the use of purge gas should be reduced, and a second alarm which indicates that it should be stopped.

2) the temperature of the vapour phase and
3) the pressure of the vapour phase.

As noted in respect of the first aspect, the mixture of liquid and vapour in the separation vessel are in equilibrium, with the "heavier" components predominantly in the liquid phase. As well as an increase in the temperature, therefore, a reduction in pressure will also result in a shift in the equilibrium which would cause an increase in the amount of the "heavier" components in the vapour phase. Thus, an increase in temperature and/or a reduction in pressure can be used as an indication that the amount of the "heavier" components which should be removed in the liquid phase has reduced, and that the amount of such components remaining in the purge gas stream has increased.

Preferably the temperature and pressure of the vapour phase are measured directly within the separation vessel, although measurements at other locations are not precluded as long as the measurements can be correlated to the values within the separation vessel.

Again one or more alarms may be provided which indicate a limit at which the recycling of the vapour should be stopped or reduced, for example, a first level alarm at which the use of purge gas should be reduced, and a second level alarm which indicates that it should be stopped.

The interlock according to either the first or second aspect of the invention may be applied to the purging of polymer particles in a degassing vessel. In such a system the "heavier" components which form the liquid phase may comprise hydrocarbons such as monomers, comonomers and diluents/alkanes, whereas the purge gas may comprise an inert gas, such as nitrogen.

In a third aspect, the present invention provides a process for the degassing of a polymer powder in a degassing vessel, which process comprises:

a. passing polymer powder and purge gas to a degassing vessel wherein the purge gas contacts the polymer powder, b. removing degassed polymer from the degassing vessel c. removing a stream comprising the purge gas and degassed hydrocarbons from the degassing vessel, d. passing the removed stream to a liquid-vapour separation vessel wherein there is present a liquid phase comprising at least some of the degassed hydrocarbons and a vapour phase comprising at least some of the purge gas, and e. recycling vapour resulting from the separation vessel as purge gas in step (a) characterised in that the temperature of the vapour phase resulting from the liquid-vapour separation is measured, and that in the event that the temperature measurement indicates a loss in separation efficiency in the separation vessel then the recycling of the resulting vapour as purge gas is stopped or reduced.

Similarly, in a fourth aspect, the present invention provides a process for the degassing of a polymer powder in a degassing vessel, which process comprises:

a. passing polymer powder and purge gas to a degassing vessel wherein the purge gas contacts the polymer powder, b. removing degassed polymer from the degassing vessel c. removing a stream comprising the purge gas and degassed hydrocarbons from the degassing vessel, d. passing the removed stream to a liquid-vapour separation vessel wherein there is present a liquid phase comprising at least some of the degassed hydrocarbons and a vapour phase comprising at least some of the purge gas, and e. recycling vapour resulting from the separation vessel as purge gas in step (a) characterised in that there are measured
1) the liquid level,
2) the temperature of the vapour phase, and
3) the pressure of the vapour phase, for the liquid-vapour separation using the liquid-vapour separation vessel, and that in the event that these measurements indicate a loss in separation efficiency in the separation vessel then the recycling of the resulting vapour as purge gas in step (e) is stopped or reduced.

The loss of separation efficiency in the third aspect may be indicated by comparing said measured temperature to a threshold value.

Similarly, the loss of separation efficiency in the fourth aspect may be indicated by comparing each of the measured parameters to a corresponding threshold value, and checking whether one or more of the following apply:

i) the liquid level is above its defined threshold value, ii) the temperature is above its defined threshold value, or iii) the pressure is below its defined threshold value.

In the process of the third and fourth aspects of the present invention there is recovered from the degassing vessel a stream comprising the purge gas and degassed hydrocarbons, being hydrocarbons removed from the polymer in the degassing vessel. This is then passed in a separation vessel in which there is present a liquid phase comprising at least some of the degassed hydrocarbons and a vapour phase comprising the purge gas. The liquid-vapour separation vessel is preferably downstream of a condensation/compression system, by which is meant a system in which the purge gas is cooled and compressed in order that hydrocarbons removed from the degassed polymer condense to form the liquid phase in the separation vessel.

The liquid can be removed from the separator and discarded or incinerated, but preferably at least the majority thereof is removed and reused in the polymerisation process. In "normal" operation an equilibrium is set-up throughout the purge gas system where the degassed hydrocarbons are removed from the purge gas in the separation vessel at substantially the same rate that they accumulate in the purge gas in the degassing vessel. However, in the event of a loss of separation efficiency in the separation vessel there is a loss of the efficiency with which the degassed hydrocarbons are removed from the purge gas, which will result in an increase in the amount of hydrocarbons present in the purge gas entering the degassing vessel, and reduce the effectiveness of the removal.

In "normal" operation, the vapour resulting from the separation vessel is recycled as purge gas. The purge gas typically comprises an inert gas, and preferably is nitrogen. As is apparent from the above, the purge gas may include quantities of other components, such as hydrocarbons, that are not completely removed in the separation vessel or any other treatment units that may be present. Generally, the purge gas exiting the separation vessel is at least 70 wt % nitrogen, more preferably at least 80 wt % nitrogen.

The recycled purge gas typically further comprises hydrogen, monomer and "heavy" components, which are defined herein as hydrocarbons having 4 or more carbon atoms. Preferably the amount of such "heavy" components is less than 3 wt % preferably less than 1 wt %.

The response to the loss of separation efficiency is to stop or reduce the use of vapour from the separation vessel as purge gas until the separation efficiency can be improved again.

In a preferred embodiment, the quantity of purge gas obtained from the separation vessel is reduced and is compensated for by use of an alternative purge gas, for example, fresh nitrogen, until the separation efficiency in the separation vessel is restored. Thus, the "usual" flow of purge gas may be partially or completely replaced by a flow of the alternative purge gas.

Use of vapour from the separation vessel as purge gas is usually restarted or increased to its "normal" level once the desired separation efficiency is re-obtained. For example the liquid level can be reduced, or the pressure and/or temperature altered to increase the pressure and/or reduce the temperature. For example, compression/cooling of the stream comprising the purge gas and degassed hydrocarbons prior to the liquid-vapour separation vessel is altered to increase the pressure and/or reduce the temperature.

As noted above, this usually requires a manual reset of the interlock.

The present invention is applicable to any process which requires the degassing of polymer powder particles. For example, and preferably, the polymer powder particles to be degassed may be obtained from a gas phase polymerisation process or a slurry polymerisation process. Preferably, the polymer powder particles are polyethylene or polypropylene formed by polymerisation of ethylene or propylene respectively with one or more comonomers, most preferably comonomers having 6 or more carbon atoms.

An example of a gas phase polymerisation process in a horizontally disposed reactor vessel can be found in U.S. Pat. No. 4,921,919. Preferred gas phase processes are fluidised bed gas phase processes in vertically orientated reactors, such as described in U.S. Pat. No. 5,376,742.

An example of a suitable slurry process is that found in WO 2008/024517.

The present invention is preferably applied to a degassing vessel in which polymer is counter-currently contacted with a purge gas, usually an inert gas such as nitrogen, to remove monomers and other entrained hydrocarbons. The removal of hydrocarbons in the degassing vessel may also be assisted by a pressure reduction relative to the upstream part of the process.

The present invention is particularly applicable to an overall two-stage degassing process with a first degassing vessel at a relatively elevated pressure compared to a subsequent second degassing vessel at a relatively lower pressure. The majority of entrained monomers and other hydrocarbons, including diluents in a slurry polymerisation process, are preferably removed in the first degassing vessel at elevated pressure, and hence require reduced compression prior to passage to the separation vessel and subsequent recycle to the polymerisation process.

The invention will now be illustrated by way of the following example:

EXAMPLE 1

A fluidised bed polymerisation reactor has a diameter of 5 m, and is operated to produce LLDPE having a non-annealed density of 0.918 and a melt index ($MI_{2.16}$) of 0.9, at a temperature of 88° C., a total pressure of 24 bar and a production rate of 40 te/hr.

The polymer withdrawn contains hydrocarbons absorbed (mainly 1-hexene (comonomer) and ethylene, but also traces of ethane, hydrogen, nitrogen and feed impurities such as 2-hexene, hexane).

The polymer is passed to a first flash vessel where the pressure is reduced to 1.5 bara, and then to a degasser where the polymer is counter currently contacted with a stripping gas. The stripping gas is a recycled gas and the stripping gas flow rate is controlled at 4 Te/h. Recovered stripping gas comprising stripped hydrocarbons is compressed in a 2 stage piston compressor to 10 bar and then cooled to −35° C. via a series of heat exchangers (first with cooling water then with a refrigeration unit) where most of the heavy hydrocarbons are condensed (entraining with them also quantities of lighter components such as C2=) and fanning a vapour-liquid mixture. The vapour-liquid mixture is passed to a knock-out drum which acts as a separations vessel, the liquid being recycled to the main polymerisation loop and the vapour phase being recycled as stripping gas to the base of the degassing vessel after re-heating, typically to 80° C.

The temperature, pressure and liquid level in the knock-out drum are monitored. Interlocks are installed that stop the vapour phase recycle to the bottom of the degassing vessel if the temperature in the knock-out drum is greater than −25° C., if the pressure in the knock-out drum is lower than 8 bar, or if the liquid level is above its normal level, and monitored/controlled by a dedicated safety computer.

If any of the above measurements ("captors") falls above/below its defined interlock level (too high temperature, too low pressure, too high liquid level) the dedicated safety computer closes an automated valve on the vapour recycle line to the base of the degassing vessel. The required stripping gas flow rate to the degasser is then automatically replaced by a "once-through" flow of nitrogen until a normal separation efficiency is recovered in the vapour-liquid knock-out drum.

The invention claimed is:

1. An interlock for use in a process for degassing of a polymer powder in a degassing vessel, which interlock comprises
   a. measuring the temperature of the vapour phase resulting from a liquid-vapour separation, which vapour phase is used as a purge gas in a degassing vessel,
   b. comparing said measured temperature to a threshold value, and
   c. in the event that the measured temperature is above the threshold value then the use of the vapour as purge gas is stopped or reduced.

2. An interlock for use in a process for degassing of a polymer powder in a degassing vessel, which interlock comprises:
a. measuring:
1) the liquid level,
2) the temperature of the vapour phase, and
3) the pressure of the vapour phase,
for a liquid-vapour separation using a liquid-vapour separation vessel from which the resulting vapour phase is removed and used as a purge gas,
b. comparing each of said measured parameters to a corresponding threshold value, and
c. in the event that one or more of the following apply:
i) the measured liquid level is above its defined threshold value,
ii) the measured temperature is above its defined threshold value, or
iii) the measured pressure is below its defined threshold value
then the use of the removed resulting vapour as purge gas is stopped or reduced.

3. An interlock according to claim 1 wherein the liquid-vapour separation vessel is downstream of a condensation/compression system, by which is meant a system in which the purge gas is cooled and compressed in order that hydrocarbons removed from the degassed polymer condense to form the liquid phase in the separation vessel.

4. n interlock according to claim 2 wherein the liquid-vapour separation vessel is downstream of a condensation/compression system, by which is meant a system in which the purge gas is cooled and compressed in order that hydrocarbons removed from the degassed polymer condense to form the liquid phase in the separation vessel.

5. A process for the degassing of a polymer powder in a degassing vessel, which process comprises:
a. passing polymer powder and purge gas to a degassing vessel wherein the purge gas contacts the polymer powder,
b. removing degassed polymer from the degassing vessel
c. removing a stream comprising the purge gas and degassed hydrocarbons from the degassing vessel,
d. passing the removed stream to a liquid-vapour separation vessel wherein there is present a liquid phase comprising at least some of the degassed hydrocarbons and a vapour phase comprising the purge gas, and
e. recycling vapour resulting from the separation vessel as purge gas in step (a)
wherein the temperature of the vapour phase resulting from the liquid-vapour separation is measured, and that in the event that the temperature measurement indicates a loss in separation efficiency in the separation vessel then the recycling of the resulting vapour as purge gas is stopped or reduced.

6. A process for the degassing of a polymer powder in a degassing vessel, which process comprises:
a. passing polymer powder and purge gas to a degassing vessel wherein the purge gas contacts the polymer powder,
b. removing degassed polymer from the degassing vessel
c. removing a stream comprising the purge gas and degassed hydrocarbons from the degassing vessel,
d. passing the removed stream to a liquid-vapour separation vessel wherein there is present a liquid phase comprising at least some of the degassed hydrocarbons and a vapour phase comprising the purge gas, and
e. recycling vapour resulting from the separation vessel as purge gas in step (a)
wherein there are measured
1) the liquid level,
2) the temperature of the vapour phase, and
3) the pressure of the vapour phase,
for the liquid-vapour separation using the liquid-vapour separation vessel, and that in the event that these measurements indicate a loss in separation efficiency in the separation vessel then the recycling of the resulting vapour as purge gas in step (e) is stopped or reduced.

7. A process according to claim 5 wherein the stream comprising the purge gas and degassed hydrocarbons is passed through a condensation/compression system, by which is meant a system in which the purge gas is cooled and compressed in order that hydrocarbons removed from the degassed polymer condense to form the liquid phase in the separation vessel.

8. A process according to claim 6 wherein the stream comprising the purge gas and degassed hydrocarbons is passed through a condensation/compression system, by which is meant a system in which the purge gas is cooled and compressed in order that hydrocarbons removed from the degassed polymer condense to form the liquid phase in the separation vessel.

9. A process according to claim 5 wherein the purge gas comprises nitrogen.

10. A process according to claim 6 wherein the purge gas comprises nitrogen.

11. A process according to claim 5 wherein the reduction in quantity of purge gas from the separation vessel is compensated for by use of an alternative purge gas.

12. A process according to claim 6 wherein the reduction in quantity of purge gas from the separation vessel is compensated for by use of an alternative purge gas.

13. A process according to claim 5 wherein the polymer powder particles to be degassed are obtained from a gas phase polymerisation process or a slurry polymerisation process.

14. A process according to claim 6 wherein the polymer powder particles to be degassed are obtained from a gas phase polymerisation process or a slurry polymerisation process.

15. A process according to claim 5 wherein the polymer powder particles are polyethylene or polypropylene.

16. A process according to claim 6 wherein the polymer powder particles are polyethylene or polypropylene.

* * * * *